US005866954A

United States Patent [19]
Daniel et al.

[11] Patent Number: 5,866,954
[45] Date of Patent: Feb. 2, 1999

[54] PASSENGER INFLATABLE RESTRAINT CONTROL APPARATUS

[75] Inventors: Thomas R. Daniel, Fenton; Sean P. Meldrum, Warren, both of Mich.

[73] Assignee: ITT Automotive, Inc., Auburn Hills, Mich.

[21] Appl. No.: 707,624

[22] Filed: Sep. 5, 1996

[51] Int. Cl.⁶ ................................................. B60R 21/32
[52] U.S. Cl. ........................ 307/10.1; 307/9.1; 180/282; 280/728.1; 340/436
[58] Field of Search ..................................... 307/9.1, 10.1; 701/1, 36, 45; 340/438, 669; 70/158, 174, 237, 255, 258, 270, 336, 344, 434, 447, 449; 280/727, 728.1, 728.2, 735; 180/271, 273, 282

[56] References Cited

U.S. PATENT DOCUMENTS 5,544,914  8/1996  Borninski et al. ..................... 307/10.1
5,608,298  3/1997  Frolov et al. ............................ 318/286
5,680,783  10/1997  Kuroda ..................................... 70/277

OTHER PUBLICATIONS

Ford F–150 1997 Brochure Publication Date Oct. 1995.

*Primary Examiner*—Jeffrey Gaffin
*Assistant Examiner*—Peter Ganjian
*Attorney, Agent, or Firm*—J. Gordon Lewis

[57] ABSTRACT

A key cylinder, upon receiving a valid key, inserted through the key cylinder, is disengaged from a cylinder lock enabling the key and the key cylinder to be rotated between two positions. During rotation, an arm on the key cylinder engages a contact carrier to switch a contactor mounted on the carrier between two positions breaking one contact and subsequently making another contact. The contacts provide output signals to a vehicle passenger restraint apparatus to selectively alternatively place the passenger restraint apparatus in an "on" or "off" state.

18 Claims, 7 Drawing Sheets

PASSENGER INFLATABLE RESTRAINT CONTROL APPARATUS

BACKGROUND OF THE INVENTION

1. Field of the Invention

The present invention relates, in general, to vehicle safety restraints and, more specifically, to inflatable restraints, such as airbags.

2. Description of the Art

Inflatable airbags are becoming an important safety feature in modern vehicles. Currently, inflatable airbags are generally standard equipment for vehicle driver seats and are becoming more common on front passenger seats due to federal regulations.

Upon sensing an impact, the airbags are immediately ejected from the dashboard at speeds exceeding 100 mph. As such, the inflating airbag imposes a considerable amount of force on any object in its path, such as a vehicle passenger. Indeed, this is the main function of the inflatable airbag; i.e., to absorb forces and thereby control and decelerate any movement of the front seat passenger(s).

However, recent studies have shown that serious injuries to children whether or not they are seated in a child seat mounted on the vehicle front seat and even frail adults can occur due to the high impact forces generated by the airbag. While it is preferred that children and frail adults ride in a rear seat of the vehicle, such is not possible in certain small size vehicles, such as two seat sports cars or trucks.

Federal regulations have been proposed to enable selective control over the passenger side airbag thereby preventing inflation of the passenger side airbag even in the event of a collision when a child is seated on the front passenger seat. One proposed approach is to provide an on/off switch to enable the driver of the vehicle to selectively control the "on" or "off" state of the passenger inflatable restraint system.

Thus, it would be desirable to provide an apparatus for controlling the inflatable vehicle passenger restraint system which provides an easily visible indication of the "on" or "off" state of the inflatable restraint system, is switchable between "on" and "off" states only by an authorized individual, and which prevents unauthorized switching by unauthorized individuals.

SUMMARY OF THE INVENTION

The present invention is a control apparatus for selectively controlling the energized or deenergized state of a vehicle passenger inflatable restraint system.

The present apparatus includes a housing and means, mounted in the housing, for receiving a valid key. Circuit means are mounted in the housing for forming a circuit selectively providing on and off signals to an inflatable restraint system. A contactor means, also mounted in the housing, is movable between one of first and second positions, and engages the circuit means in the first and second positions. Means, responsive to rotation of the key receiving means, are provided for moving the contactor means between the first and second positions respectively providing the on and off signals upon rotation of a valid key inserted into the key receiving means. Means are mounted in the housing for permitting rotation of the key receiving means only when a valid key is fully inserted through the key receiving means.

The means for permitting rotation of the key receiving means comprises lock means mounted in the housing. Biasing means normally bias the lock means into engagement with the key receiving means. A valid key fully inserted through the key receiving means disengages the lock means from engagement with the key receiving means to permit rotation of the key receiving means between the first and second positions. The key receiving means and the lock means include releasibly interengagable means for non-rotatingly engaging the key receiving means and the lock means. Means are provided for non-rotatably, movably mounting the lock means in the housing. The mounting means comprises at least one flange formed on the lock means. A slot formed in the housing non-rotatingly receives the at least one flange on the lock means.

The contactor moving means comprises a contact carrier movably mounted in the housing. Means, mounted on the key receiving means, engages the contact carrier on rotation of the key receiving means to move the contact carrier between the first and the second positions. Means are provided for biasing the key receiving means to remain in one of the first and second positions. The biasing means comprises a cam carried on the key receiving means. Cam plunger means, biasingly mounted in the housing, engages the cam to limit rotation of the key receiving means only to one of the first and second position.

A first indicator means is visibly mounted in the housing, for indicating, when energized, the key receiving means being in the first position. Second indicator means is also visibly mounted in the housing for indicating, when energized, the key receiving means being in a second position.

The key receiving means comprises a slot configured to receive only a valid key. A cap means is rotatably mounted in the housing and surrounds the slot. The cap means has an apex acting as a pointer extending toward one of the first and second indicator means.

The present invention provides an apparatus for controlling the "on" or "off" state of a vehicle passenger inflatable restraint system in an easily usable manner while at the same time preventing unauthorized individuals from changing the state of the passenger inflatable restraint system. The present apparatus insures either "on" or "off" states without the possibility of any intermediate switch positions. The present apparatus also provides an easily visible indication of the "on" or "off" state of the passenger inflatable restraint system. The visible indication is bright enough for daytime use and is provided with an automatic dimming features for night time usage. The control apparatus is also capable of detecting a non-working light indicator and provides a signal to the vehicle body computer which defaults to the inflatable restraint "on" state.

BRIEF DESCRIPTION OF THE DRAWINGS

The various features, advantages and other uses of the present invention will become more apparent by referring to the following detailed description and drawing in which.

DESCRIPTION OF THE PREFERRED EMBODIMENTS

Figure 1:
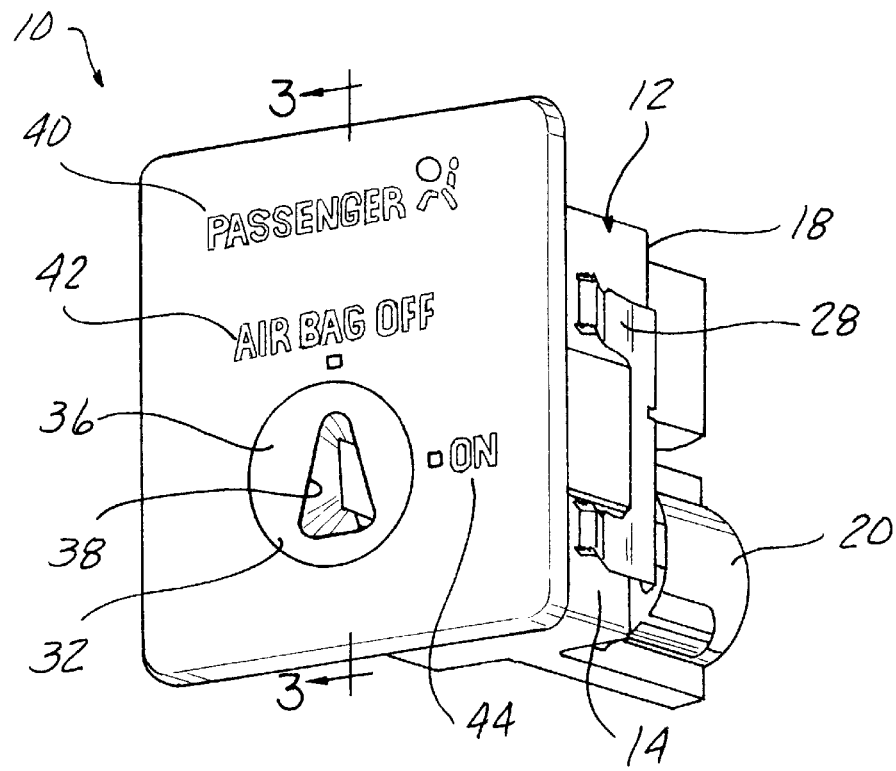
FIG. 1 is a perspective view of a vehicle passenger inflatable restraint control apparatus constructed in accordance with the teachings of the present invention.

Referring now to the drawings there is depicted a control apparatus 10 for controlling the energizable state of a passenger inflatable restraint system or airbag.

Figure 7:
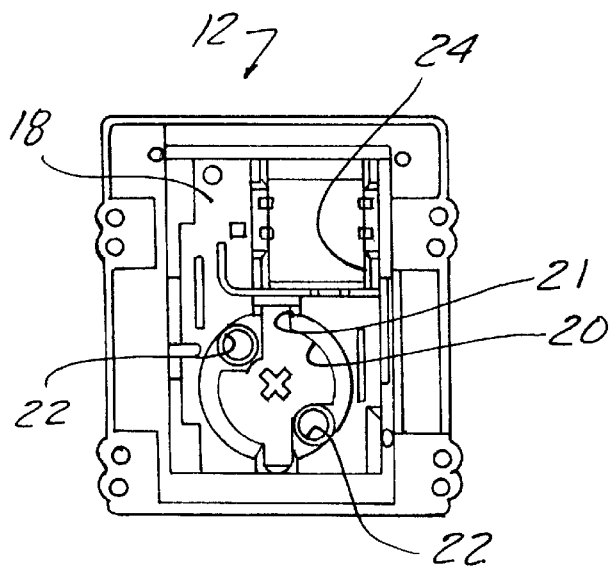
FIG. 7 is a front elevational view of the housing shown in FIGS. 1 and 2.

The apparatus 10 includes a housing 12 shown in FIGS. 1, 2, 3 and 7. The housing 12 is formed with side walls 14 which extend between a front mounting flange 16 surrounding an open end and a back wall 18. A generally cylindrical, hollow extension 20 extends outward from the back wall 18. A pair of cylindrical recesses or bores 22 are formed interiorly on diametrically opposed sides of the extension 20 as shown in FIG. 7.

A generally square aperture 24 is also formed in the back wall 18 of the housing 12, the purpose of which will be described in greater detail hereafter.

A pair of mounting clips 28 are releasibly engagable with two opposed side walls 14 of the housing 12. The clips 28 include integral latch members for releasibly mounting the housing 12 to a support, such as a vehicle dash board or instrument panel, not shown.

Figure 3:
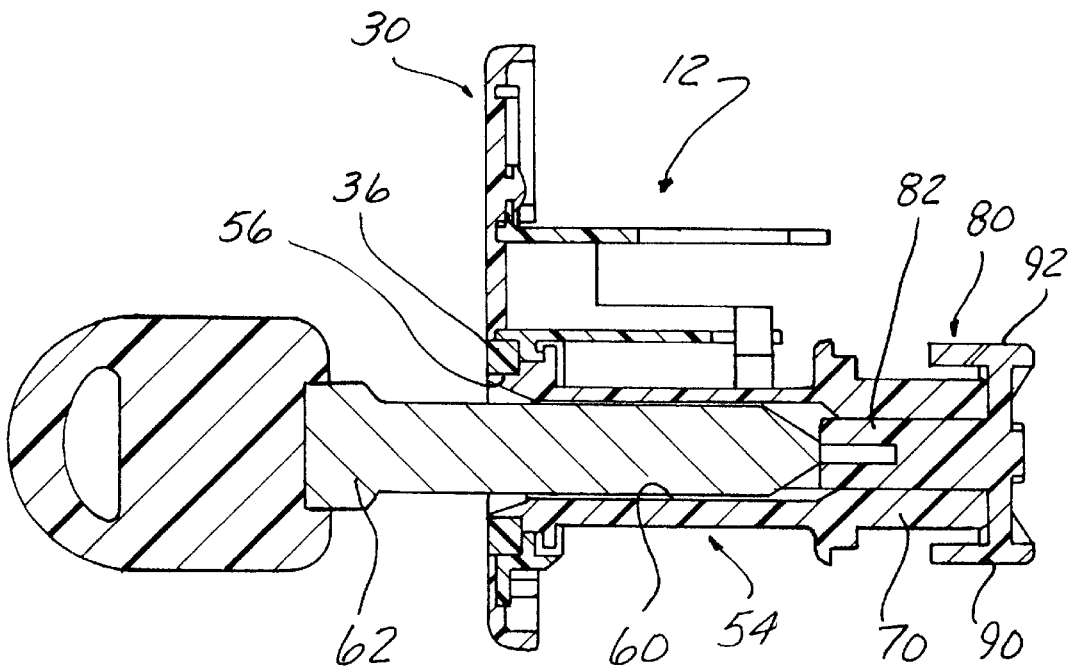
FIG. 3 is a cross-sectional view generally taken along lines 3—3 in FIG. 1 and showing the insertion of a key into the apparatus.
Figure 2:
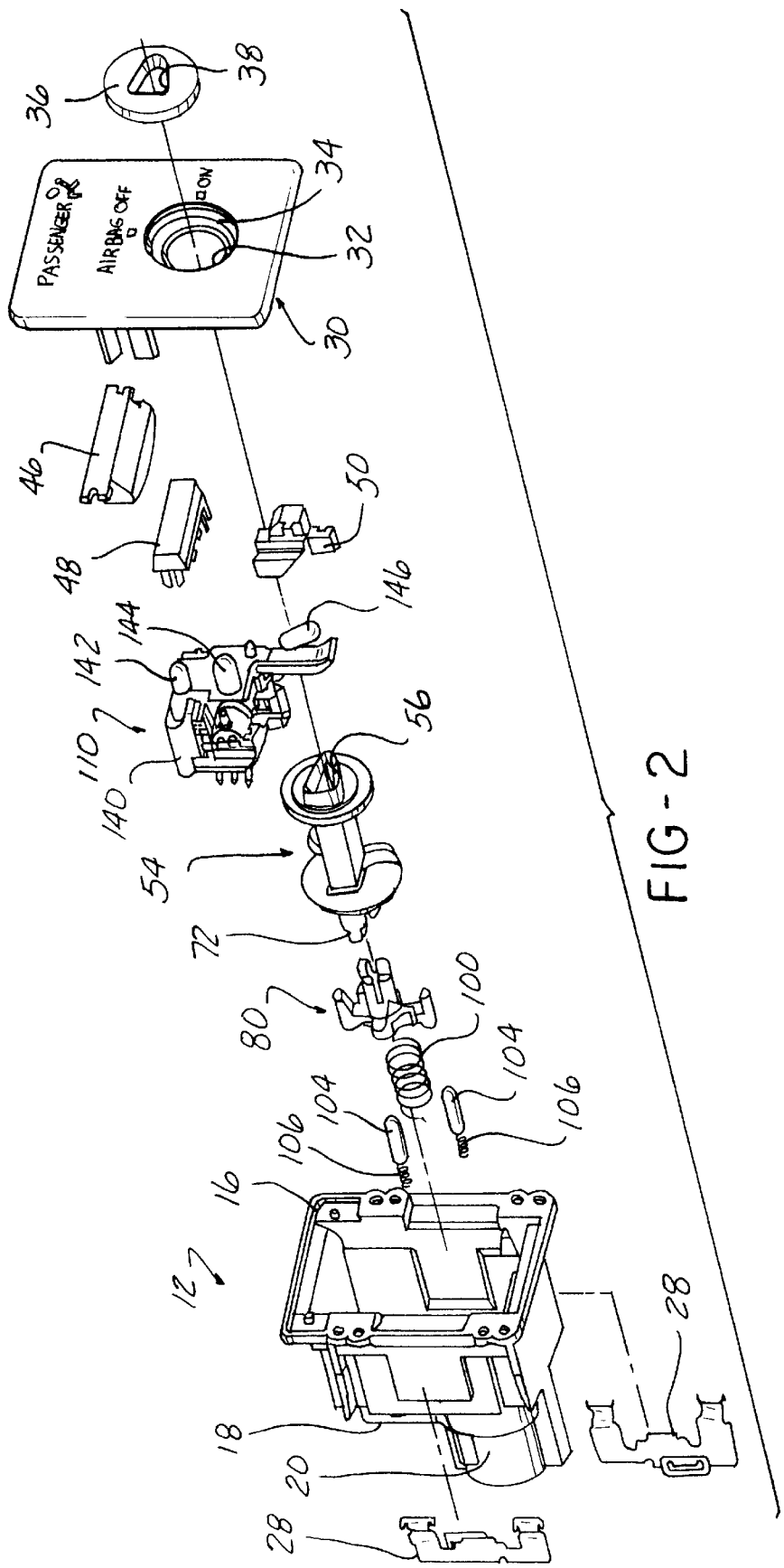
FIG. 2 is an exploded perspective view of the components of the control apparatus shown in FIG. 1.

As shown in FIGS. 1, 2 and 3, a bezel or faceplate 30 is releasibly mountable on the front mounting flange 16 of the housing 12 as shown in FIGS. 1, 2 and 3. The bezel 30 has an overall size slightly larger than the overall size of the front mounting flange 16. An aperture 32 is formed in the bezel 30. A shoulder 34 formed at an inner end of the aperture 32 rotatably supports a key cylinder cap 36. A generally arrow-shaped, aperture 38 having a pointed apex is formed in the key cylinder cap 36.

The bezel 30 is opaque except for several clear indicia or labels which are formed of a light transmitting, generally clear plastic. A first indicia 40 is formed on the bezel 30 and includes the word "passenger" along with an inflated airbag/passenger symbol. A second indicia 42 includes the words "airbag off" and a small clear area. Finally, a third indicia 44 includes the word "on" and a small clear indicator box adjacent thereto.

A plurality of light transmitting members or light pipes 46, 48 and 50 are engagable with projections extending from the rear surface of the bezel 30 and are disposed adjacent one of the indicia 40, 42 and 44, respectively. Each light transmitting member or pipe 46, 48 and 50 includes an internal bore or recess sized to receive a visible indicator, such as a light bulb described hereafter.

As shown in FIG. 1, the arrow-shaped bore 38 in the key cylinder cap 36 forms a pointer in that the narrow or apex end of the bore 38 points toward one of the two indicia, such as the second or third indicia 42 and 44 depending upon the position of the key finder cap 36.

A key cylinder denoted generally by reference number 54 in FIGS. 2, 3, 4, 6A and 6B is rotatably mounted in the housing 12. The key cylinder 54 has an elongated, cylindrical shape which a generally arrow-shaped flange 56 at a first end. The flange 56 is sized complementary to the bore 38 in the key cylinder cap 36 so as to extend through the bore 38 in the key cylinder cap 36.

An enlarged flange 58 is spaced from the outer end of the flange 56. A hollow bore 60 extends through the key cylinder 54 from the outer end of the flange 56 to an opposite end. The bore 60, as shown in FIG. 3, has a cross-sectional shape complementary to the cross-section of a particular key 62. The key 62 may be any valid key of a particular class of keys, such as all driver's keys for a particular vehicle made by a particular manufacturer, such as a particular model truck, car, etc. The key 62 may also be a special key without any notches found in conventional keys used with key lock cylinders. The matched bore 60 and valid key 62 ensures that only one of a particular class of keys 62 may be inserted into the bore 60. Anti-tampering or unauthorized operation of the key cylinder 54 is also provided as described hereafter.

Figure 4:
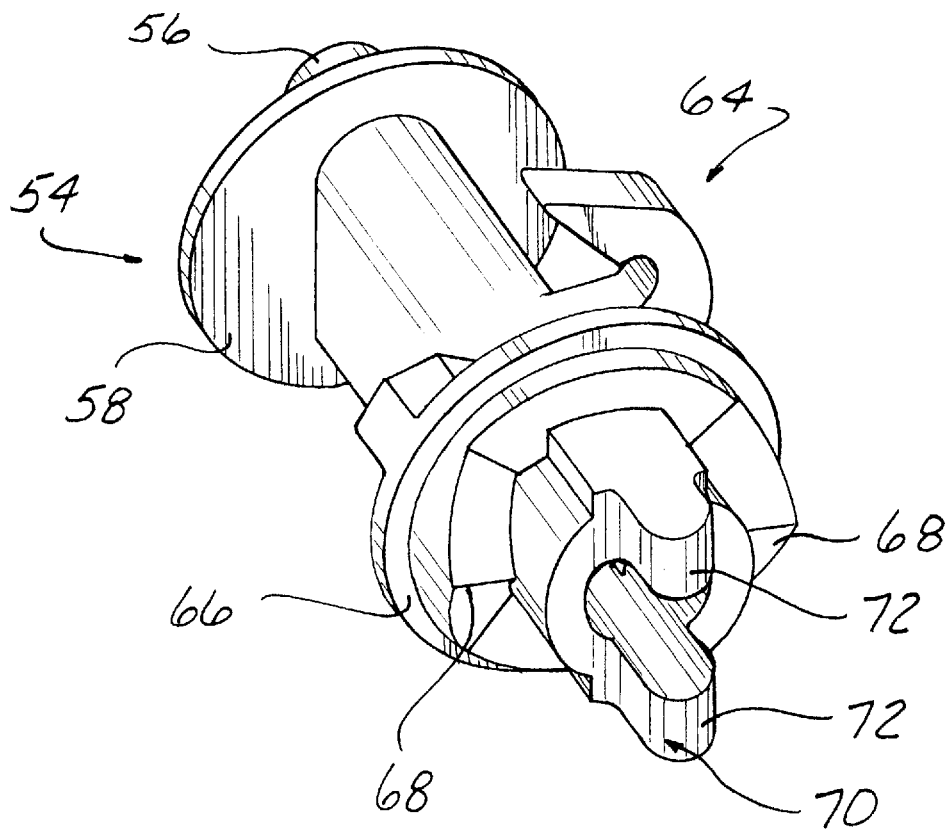
FIG. 4 is a rear perspective view of the key cylinder shown in FIG. 2.

As shown in FIG. 4, a hook-shaped arm 64 is formed on and projects outward and then inward in a generally U-shaped configuration from a cylindrical, tubular portion of the key cylinder 54 extending from the enlarged flange 58. A second enlarged flange 66 is formed on the cylindrical portion adjacent to the arm 64. A pair of cams 68, each generally in the form of a V-shaped projection, are diametrically formed on the rear flange 66 and project outward therefrom. The purpose of the cams 68 will also be described in detail hereafter.

Finally, a cylindrical extension 70 projects from the rear flange 66 outward between the diametrically opposed pair of cams 68. The extension 70 forms the end of the cylindrical bore 60 extending through the key cylinder 54. The extension 70 terminates in two generally arcuate ends 72 which form cam followers as described hereafter.

A cylinder lock 80 is shown in FIG. 2, and in greater detail in FIGS. 3, 5, 6A and 6B. The cylinder lock 80 includes a generally cylindrical center portion 82 having a slot 84 extending partially therethrough. The slot 84 divides the central portion 82 into two spaced legs 86 and 88. The width of the slot 84 and the orientation of the cylinder lock 80 in the extension 70 of the key cylinder 54 orients the lateral extent of the slot 84 crosswise to the width of the key 62 when the key 62 is inserted through the bore 60 in the key cylinder 54 as shown in FIG. 3.

Figure 5:
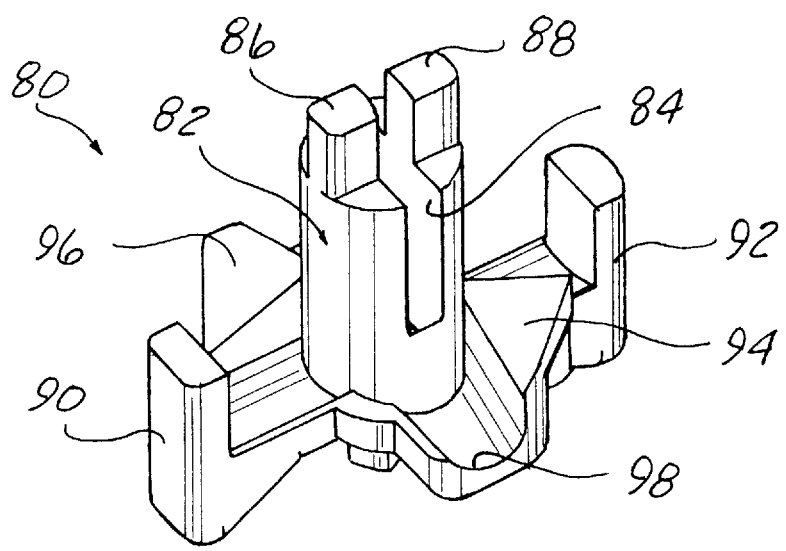
FIG. 5 is an enlarged perspective view of the lock cylinder also shown in FIG. 2.

The cylinder lock 80 also includes a base portion with a pair of outwardly extending side flanges 90 and 92 which are disposed diametrically opposite from each other. The side flanges 90 and 92 seat within slots 21, see FIG. 7, in the extension 20 to non-rotatably mount the cylinder lock in the housing 12. Cams 94 and 96 are formed on the base. Arcuate-shaped recesses 98, only one of which is shown in FIG. 5, are disposed on either side of each cam 94 and 96.

Figure 6A:
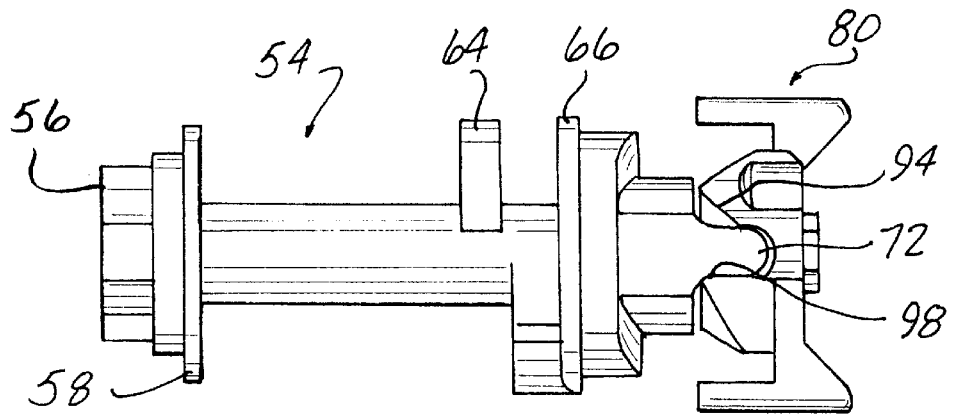
FIGS. 6A and 6B are side elevational views showing the two position interaction of the key cylinder and the lock cylinder shown in FIGS. 4 and 5.
Figure 6B:
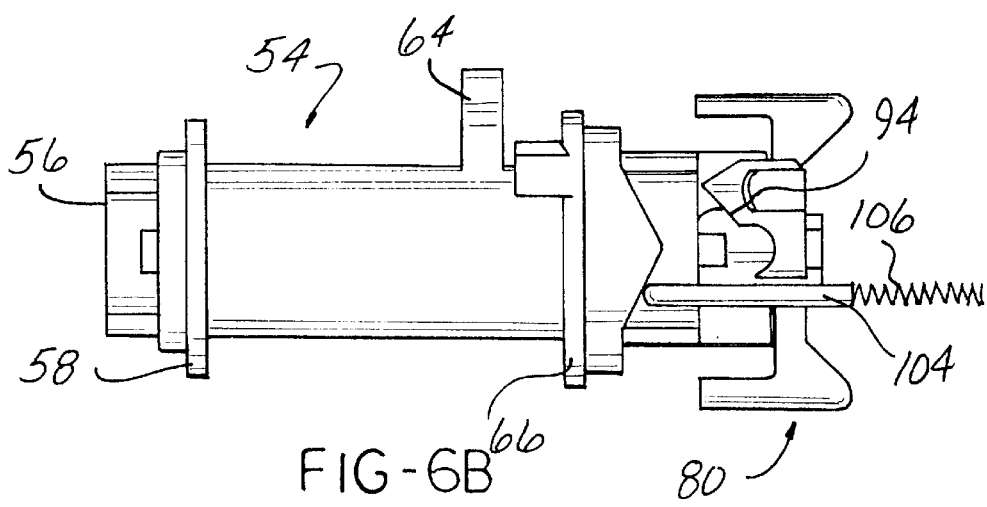

As shown in FIG. 2, a biasing spring 100 is disposed within the interior of the cylindrical extension 20 of the housing 12 and normally biases the cylinder lock 80 into engagement with the ends 72 of the key cylinder 54 with the legs 86 and 88 slidably inserted into the bore 60 in the key cylinder 54 as shown in FIG. 3. In this engaged position, the arcuate ends or cam followers 72 on the key cylinder 54 seat within the recesses 98 in the cylinder lock 80 as shown in FIG. 6A. Insertion of a valid key 62 into the bore 60 in the key cylinder 54, as shown in FIG. 3, followed by a continued additional axial insertion force on the key 62 overcomes the biasing force of the spring 100 and enables the key 62 to slide the cylinder lock 80 toward the back wall 18 of the housing 12 thereby disengaging the cylinder lock 80 from the key cylinder 54. In this position, the key 62 and the key cylinder 54 may be rotated in one direction as described hereafter. During such rotation, the cam followers 72 move over the cams 94 and 96 on the cylinder lock 80 as shown in FIGS. 6A and 6B, and seat in a recess on an opposite side of the cam 94 as shown in FIG. 6B. This defines a positive rotated position of the key cylinder 54. From the position shown in FIG. 6B, a similar sequence can take place whereby the key cylinder 54 is rotated in an opposite direction back to the configuration shown in FIG. 6A which is a second positive position.

A pair of cylindrical cam plungers 104 are mounted in the bores 22 in the extension 20 in the housing 12 as shown in FIG. 7. The cam plungers 104 are biased outwardly from the back wall 18 of the housing 12 by means of springs 106. As shown in FIG. 6B, both of the cam plungers 104 engage the cams 68 formed on the rear flange 66 on the key cylinder 54. The cam plungers 104 provide a positive 90° positional movement of the key cylinder without any possible stoppage of the key cylinder 54 in an intermediate position. During rotation of the key cylinder 54 in one direction, the cams 68 will slide over the cam plungers 104 until the cam plungers 104 seat on the other side of the cam 68. This locks the key cylinder 54 in the rotated position until it is rotated in an opposite direction by the key 62.

An invalid key will not fit within the bore 60 in the key cylinder 54. Further, a thin elongated tool, such as a screwdriver or pick, will upon insertion within the key cylinder 54, slide into the slot 84 in the cylinder lock 80 and not disengage the key cylinder 54 from the cylinder lock 80.

Figure 8:
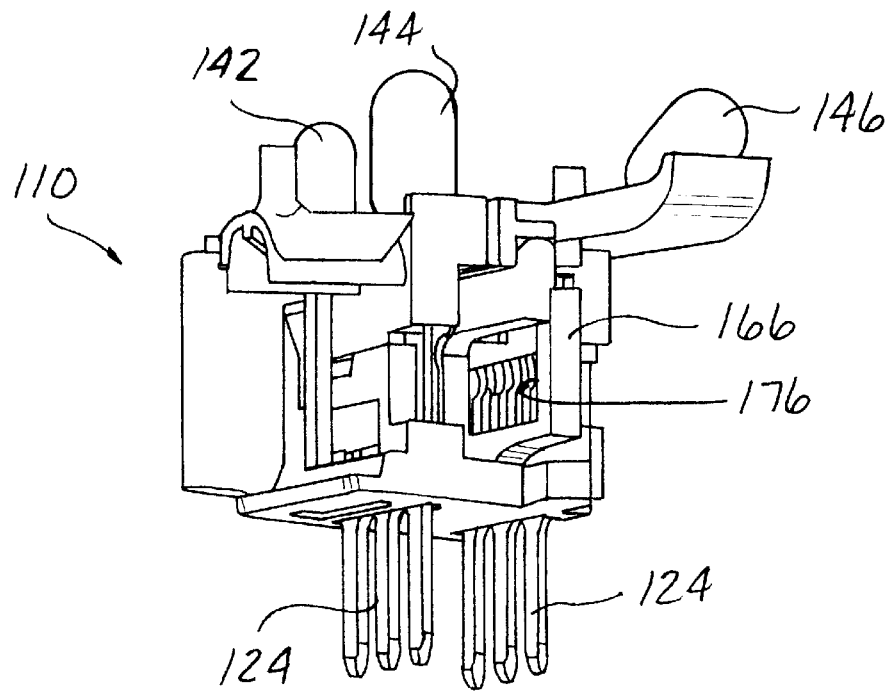
FIG. 8 is an enlarged, perspective view of the switch module shown in FIG. 2.
Figure 10:
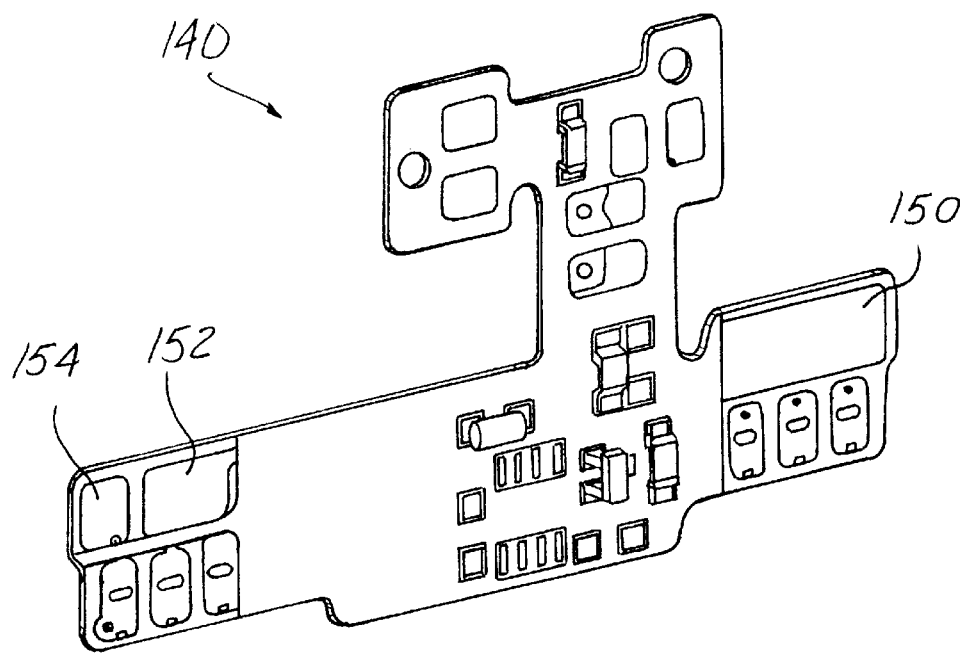
FIG. 10 is an enlarged, perspective view of the flex circuit illustrated in its preassembly, unfolded position.
Figure 9:
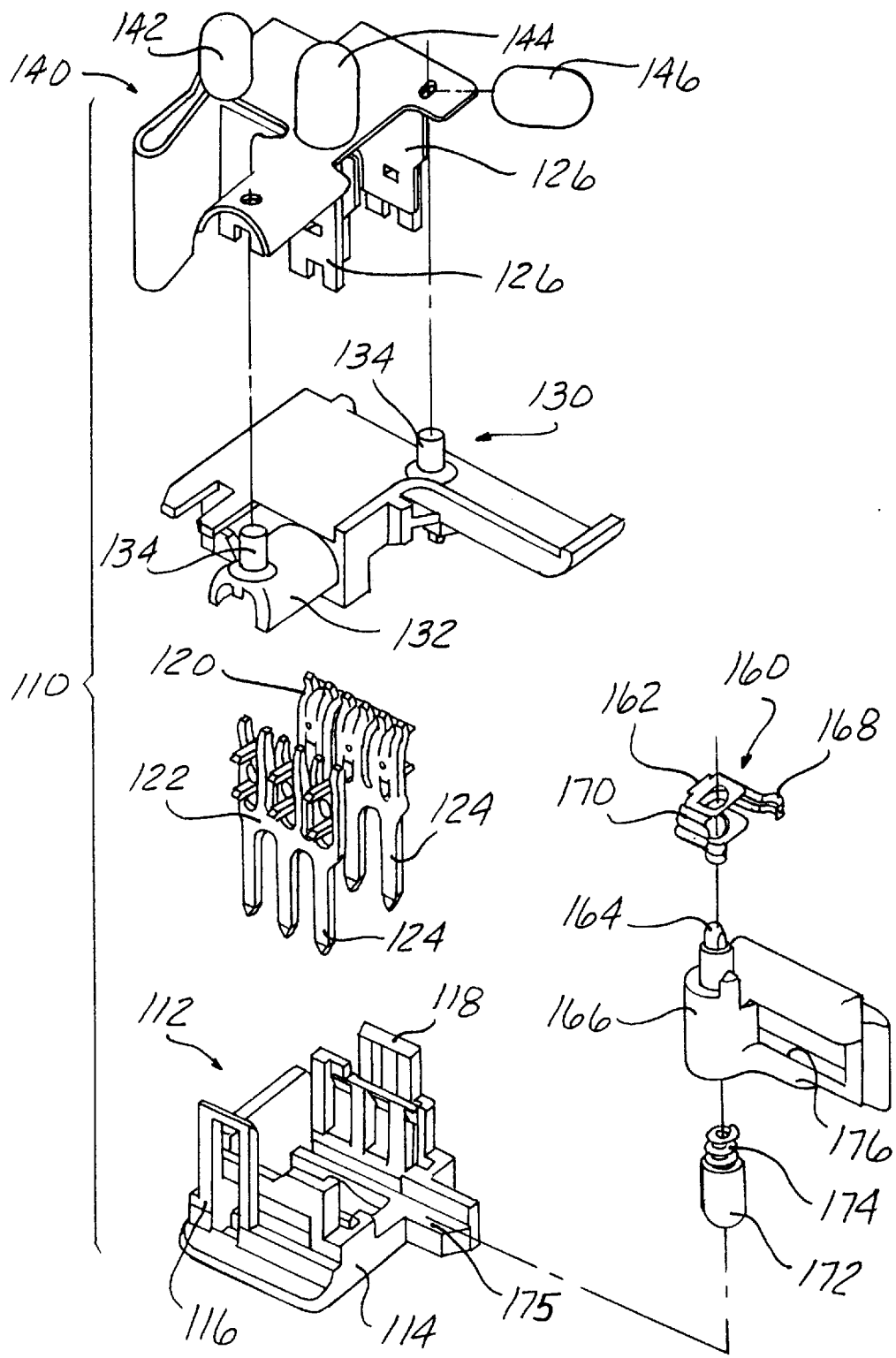
FIG. 9 is an exploded, perspective view of the components of the switch module shown in FIG. 8.

A switch module denoted by reference number 110 is shown generally in FIG. 2 and in greater detail in FIGS. 8–10. The switch module 110 includes a circuit base 112 formed with a bottom wall 114 and a pair of upstanding latch arms 116 and 118 which engage latch fingers formed on a circuit carrier described hereafter. A pair of identical pin assemblies 120 and 122 are each formed with a plurality, such as three by example, of pins 124 which includes upper latch fingers respectively engagable with apertures in rigid backer boards 126 shown in FIG. 9. Each of the pins 124, after separation, provides a separate connection to external circuitry as described hereafter and shown in FIGS. 11A and 11B. The pin assemblies 120 and 122 and the attached backer boards 126 are slidably inserted through apertures adjacent to the aperture 24 in the bottom wall 18 of the housing 12 as shown in FIG. 7 such that the ends of the pins 124 extend exteriorly into a recess formed in the back wall 18 of the housing 12.

A circuit cap 130 includes a generally arcuate portion 132 forming a flex circuit support and a pair of pins 134 which engage apertures in the flex circuit, as described hereafter, to position and mount the flex circuit on the circuit cap 130. Latch fingers on the circuit cap 130 engage the latch arms 116 and 118 in the circuit base 112 to connect the circuit cap 130 to the circuit base 112 and to capture the flex circuit and the pin assemblies 120 and 122 therebetween.

A flex circuit denoted generally by reference number 140 is shown generally in FIGS. 2 and 9, and in greater detail in FIG. 10. The flex circuit 140 contains the circuitry shown in FIGS. 11A and 11B as well as contact connections or pads for the pins 124. The flex circuit 140 also includes a plurality of lights, such as tungsten light bulbs 142, 144 and 146. Colored covers or caps may be disposed over each of the light bulbs 142, 144 and 146 to provide distinct visible light, such as red, yellow, etc.

As shown in FIG. 10, a first contact pad 150 is formed on the flex circuit 140. Second and third contact pads 152 and 154 are also formed on the flex circuit 140 and spaced from each other and from the first contact pad 150. When the flex circuit 140 is folded into the configuration shown in FIG. 9 with an upper portion disposed over the upper surface of the circuit cap 130 in engagement with the pins 134, the light bulbs 142, 144 and 146 extend above the circuit cap 130. Further, the contact pads 150, 152 and 154 are disposed facing each other between the backer boards 126. Thus, the contact pads 150, 152 and 154 are in position to engage the contacts on a contactor 160 shown in FIG. 9.

The contactor 160 has a central portion 162 with an aperture sized to mountingly receive a projection 164 extending upward from a contact carrier 166. The contactor 160 includes a pair of contact arms 168 and 170 which extend oppositely from the central portion 162. By way of example, each of the contact arms 168 and 170 is bifurcated. A detent plunger assembly formed of a hollow, tubular member 172 and an interior mounted biasing spring 174 are movably disposed in a recess in the contact carrier 166 with the detent plunger 172 riding in a groove 175 on the bottom wall 114 of the circuit base 112. The first contact arm 168 is positioned to engage the first contact pad 150 and slide therealong in continuous contact during movement of the contact carrier 166 as described hereafter. The second contact arm 170 is positioned to switch between electrical engagement with the second contact pad 152 and the third contact pad 154 on movement of the contact carrier 166 between first and second positions.

As shown in FIGS. 8 and 9, an aperture or slot 176 is formed in the contact carrier 166. An outer end portion of the aperture 176 is accessible exteriorly of the circuit base 112 as shown in FIG. 8 and is positioned to be engaged by the hook arm 64 on the key cylinder 54 during rotation of the key cylinder 54 in one direction from a first position to a second position. This engagement causes sliding movement of the contact carrier 166 in the circuit base 112 thereby switching engagement of the second contact arm 170 from the second contact pad 152 to the third contact pad 154. It should be noted that during such sliding movement of the contact carrier 166, the first contact arm 168 remains in continuous electrical contact with the first contact pad 150.

Figure 11A:
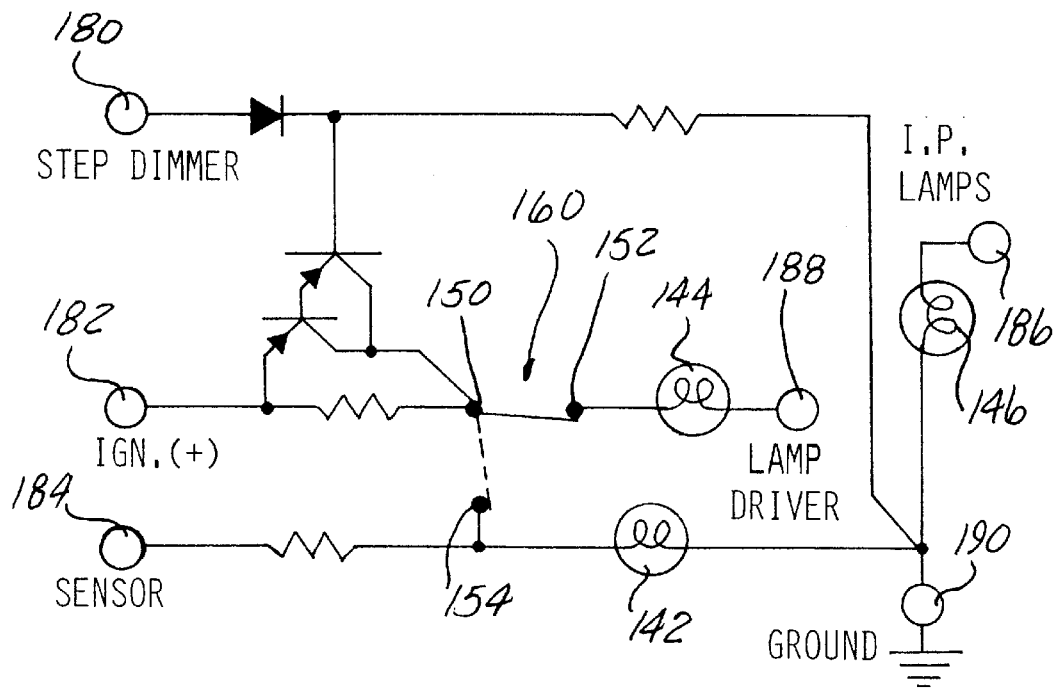
FIGS. 11A and 11B are schematic diagrams of two embodiments of the circuitry employed in the control apparatus of the subject invention.
Figure 11B:
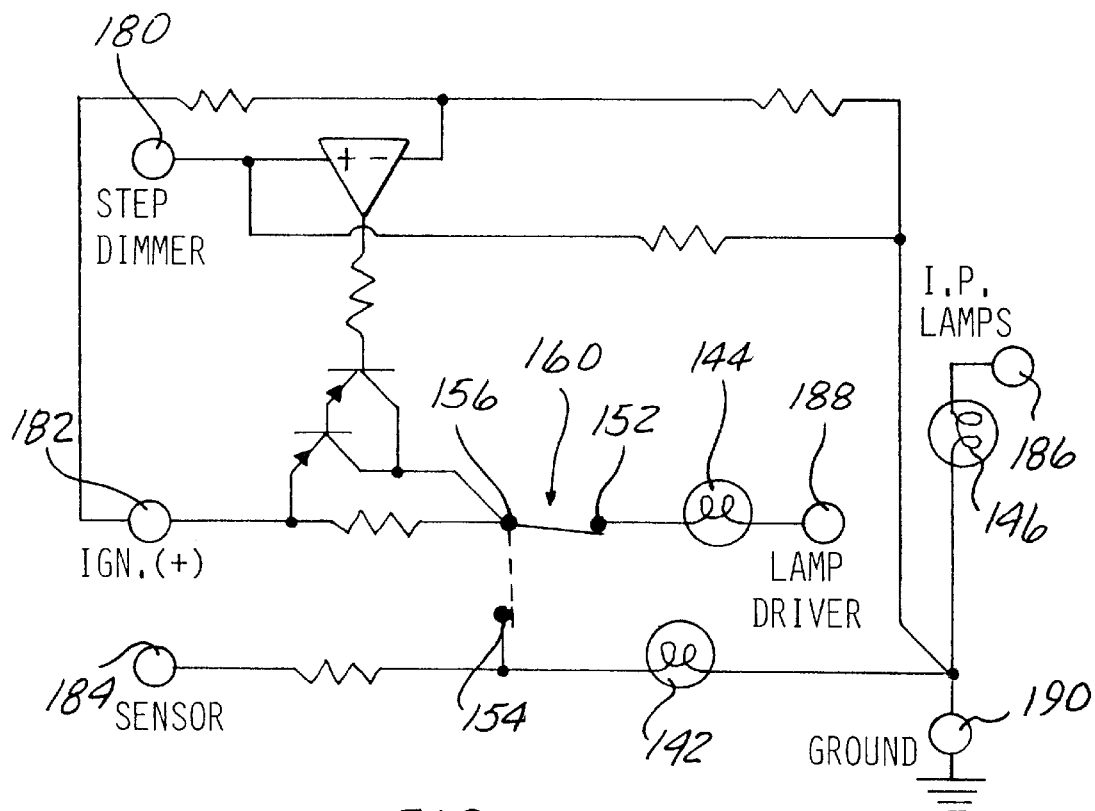

Turning now to FIGS. 11A and 11B, there are depicted alternative embodiments of the circuitry formed on the flex circuit 140. Each of the pins 124 is separated from adjacent pins 124 to form separate terminals which are engagable with respective contacts in a connector mounted on a support, such as a vehicle dash board or instrument panel, not shown. The vehicle connector is connected to a vehicle body computer. The computer provides a step dimmer signal 180, a B+ signal 182, and a signal 186 to the first indicator or light 146 which illuminates the first light 146. Input to the vehicle body computer is a lamp driver signal 188, a ground signal 190, and a "sensor" output 184. A Darlington transistor pair is connected across a resistor to the first contact pad 150. Current through the step dimmer 180 causes a proportional current flow in the Darlington transistor pair to vary the amount of current to the lights 142 and 144. With the key cylinder 54 rotated to a position in which the second contact arm 170 is connected between the contact pads 150 and 152, power from the B+ input 182 is connected to the "off" lamp 144 and provides the "lamp driver" output signal 188 which is communicated to the vehicle body computer. Failure or breakage of the filament in the light bulb 144 will be indicated by an absence of the "lamp driver" signal 188 and will be detected by the vehicle body computer which, for example, can then place the inflatable passenger restraint in a default mode in which the inflatable passenger restraint is energized for activation on appropriate sensor input.

When the key cylinder 54 is rotated in an opposite position, the contactor 160 switches position thereby making contact between the first contact pad 150 and the third contact pad 154. This supplies power to the "on" lamp 142. An output signal labeled "sensor" 184 is also sent to the vehicle body computer to indicate the "on" or "off" state of the circuit.

FIG. 11B is an alternate version of the circuit shown in FIG. 11A with all of the same elements bearing the same reference numbers In this embodiment, a comparator receives input from the step dimmer signal 180 and the B+ signal 182.

By use of the circuit shown in FIGS. 11A and 11B, when the key cylinder 54 is rotated to a position in which the contactor 160 is connected between the first contact pad 150 and the third contact pad 154, an output signal is supplied to the vehicle body computer which places the passenger restraint or airbag in an "on" state thereby enabling the passenger restraint to be automatically inflated by appropriate airbag circuitry upon receiving a suitable trigger signal in a conventional manner. Oppositely, when the key cylinder 54 is rotated to a position in which the contactor 160 is connected between the first contact pad 150 and the second contact pad 152, a signal is sent by the circuitry to the vehicle body computer to render the passenger restraint inactive despite any trigger signal which may be generated by the passenger restraint system force sensors.

What is claimed is:

1. An apparatus for controlling the energizable state of an inflatable vehicle restraint system comprising;

a housing;

means, mounted in the housing, for receiving a valid key;

circuit means, mounted in the housing, for forming a circuit selectively providing on and off signals to an inflatable restraint system;

contactor means, mounted in the housing, for movement between on of first and second positions, the contact engaging the circuit means in the first and second position;

means, responsive to rotation of the key receiving means, for moving the contactor means between first and second positions respectively providing the on and off signals upon rotation of a valid key inserted into key receiving means;

means, mounted in the housing, for permitting rotation of the key receiving means only when a valid key is fully inserted through the key receiving means; and means for illuminating a first illuminatable operator sensible status output in response to said on signal and for illuminating a second illuminatable operator sensible status output in response to said off signal, wherein one of said first and second illuminatable operator sensible status outputs is illuminated whenever the circuit means provides one of the on or off signals.

2. The apparatus of claim 1 wherein the key receiving means comprises:

a slot having a cross-section complementary to the cross-section of a valid key.

3. The apparatus of claim 1 wherein the contactor moving means comprises:

a contact carrier movably mounted in the housing;

means, mounted on the key receiving means, for engaging the contact carrier on rotation of the key receiving means to move the contact carrier between the first and the second positions.

4. The apparatus of claim 1 further comprising:

means for biasing the key receiving means to remain in one of the first and second positions.

5. The apparatus of claim 1 wherein the first and second illuminatable operator sensible status outputs respectively comprise:

first indicator means, visibly mounted in the housing, for indicating, when energized, the key receiving means being in the first position; and second indicator means, visibly mounted in the housing, for indicating, when energized, the key receiving means being in a second position.

6. The apparatus of claim 5 wherein the key receiving means comprises:

a slot configured to receive only a valid key;

cap means rotatably mounted in the housing and surrounding the slot, the cap means having an apex acting as a pointer extending toward one of the first and second indicator means.

7. The apparatus of claim 5 wherein the circuit means comprises:

means for varying the magnitude of current supplied to the first and second indicator means to vary the light intensity thereof.

8. The apparatus of claim 1 wherein the circuit means comprises:

first and second contacts;

the contactor means breaking contact with one of the first and second contacts before making contact with the other of the first and second contacts when moved between the first and second positions.

9. The apparatus of claim 1 wherein the key receiving means comprises:

a key cylinder rotatably disposed in the housing;

a bore having an open end formed in the key cylinder, the bore having at least an end portion cross-section to a cross-section of a valid key.

10. An apparatus for controlling the energizable state of an inflatable vehicle restraint system comprising:

a housing:

means, mounted in the housing, for receiving a valid key;

circuit means, mounted in the housing, for forming a circuit selectively providing on and off signals to an inflatable restraint system;

contactor means, mounted in the housing, for movement between one of first and second positions, the contactor engaging the circuit means in the first and second position;

means, responsive to rotation of the key receiving means, for moving the contactor means between first and second positions respectively providing the on and off signals upon rotation of a valid key inserted into the key receiving means;

means, mounted in the housing, for permitting rotation of the key receiving means only when a valid key is fully inserted through the key receiving means, said means for permitting rotation of the key receiving means including lock means mounted in the housing, biasing means for normally biasing the lock means into engagement with the key receiving means, and a valid key fully inserted through the key receiving means disengaging the lock means from engagement with the key receiving means to permit rotation of the key receiving means between the first and second positions.

11. The apparatus of claim 1 wherein:

the key receiving means and the lock means include releasibly interengagable means for non-rotatingly engaging the key receiving means and the lock means.

12. The apparatus of claim 1 further comprising:

means for non-rotatably, movably mounting the lock means in the housing.

13. The apparatus of claim 12 wherein the mounting means comprises:

at least one flange formed on the lock means;

a slot formed in the housing and non-rotatingly receiving the at least one flange on the lock means.

14. An apparatus for controlling the energizable state of an inflatable vehicle restraint system comprising:

a housing;

means, mounted in the housing, for receiving a valid key;

circuit means, mounted in the housing, for forming a circuit selectively providing on and off signals to an inflatable restraint system;

contactor means, mounted in the housing, for movement between one of first and second positions, the contactor engaging the circuit means in the first and second position;

means, responsive to rotation of the key receiving means, for moving the contactor means between first and second positions respectively providing the on and off signals upon rotation of a valid key inserted into the key receiving means;

means, mounted in the housing, for permitting rotation of the key receiving means only when a valid key is fully inserted through the key receiving means;

the key receiving means including a key cylinder rotatably disposed in the housing, and a bore having an open end formed in the key cylinder, the bore having at least an end portion cross-section to a cross-section of a valid key; and the contactor moving means including a contact carrier mounted in the housing, and means, carried on the key cylinder, for engaging the contact carrier on rotation of the key cylinder to move the contact carrier between first and second positions.

15. The apparatus of claim 14 wherein the engaging means comprises:

a hook arm carried on the key cylinder and movable between engaged and disengaged positions relative to the contact carrier upon bi-directional rotation of the key cylinder.

16. An apparatus for controlling the energizable state of an inflatable vehicle restraint system comprising:

a housing;

means, mounted in the housing, for receiving a valid key;

circuit means, mounted in the housing, for forming a circuit selectively providing on and off signals to an inflatable restraint system;

contactor means, mounted in the housing, for movement between one of first and second positions, the contactor engaging the circuit means in the first and second position;

means, responsive to rotation of the key receiving means, for moving the contactor means between first and second positions respectively providing the on and off signals upon rotation of a valid key inserted into the key receiving means;

means, mounted in the housing, for permitting rotation of the key receiving means only when a valid key is fully inserted through the key receiving means; and means for biasing the key receiving means to remain in one of the first and second positions including a cam carried on the key receiving means, and cam plunger means, biasingly mounted in the housing, for engaging the cam to limit rotation of the key receiving means only to one of the first and second position.

17. An apparatus for controlling the energizable state of an inflatable vehicle restraint system comprising:

a housing;

means, mounted in the housing, for receiving a valid key;

circuit means, mounted in the housing, for forming a circuit selectively providing on and off signals to an inflatable restraint system;

contactor means, mounted in the housing, for movement between one of first and second positions, the contactor engaging the circuit means in the first and second position;

means, responsive to rotation of the key receiving means, for moving the contactor means between first and second positions respectively providing the on and off signals upon rotation of a valid key inserted into the key receiving means;

means, mounted in the housing, for permitting rotation of the key receiving means only when a valid key is fully inserted through the key receiving means;

the circuit means including first and second contacts, and the contactor means breaking contact with one of the first and second contacts before making contact with the other of the first and second contacts when moved between the first and second positions; and the contactor means mounted in the housing for movement between the first and second positions in a path transverse to a longitudinal axis of a vehicle in which the housing is mounted.

18. An apparatus for controlling the energizable state of an inflatable vehicle restraint system comprising:

a housing;

means, mounted in the housing, for receiving a valid key;

circuit means, mounted in the housing, for forming a circuit selectively providing on and off signals to an inflatable restraint system;

contactor means, mounted in the housing, for movement between one of first and second positions, the contactor engaging the circuit means in the first and second position;

means, responsive to rotation of the key receiving means, for moving the contactor means between first and second positions respectively providing the on and off signals upon rotation of a valid key inserted into the key receiving means;

means, mounted in the housing, for permitting rotation of the key receiving means only when a valid key is fully inserted through the key receiving means;

the key receiving means including a key cylinder rotatably disposed in the housing, and a bore having an open end formed in the key cylinder, the bore having at least an end portion cross-section to a cross-section of a valid key;

lock means mounted on the housing and releasibly engagable with the key cylinder, for permitting rotation of the key cylinder only when a valid key is inserted through the bore in the key cylinder to disengage the lock means from the key cylinder; and an aperture formed in the lock means, the aperture having a cross-section smaller than the cross-section of the bore in the key cylinder and communicating with the bore.

* * * * *